United States Patent
Lee

(10) Patent No.: US 7,248,298 B2
(45) Date of Patent: Jul. 24, 2007

(54) FINGERPRINT RECOGNITION SENSOR AND MANUFACTURING METHOD THEREOF

(75) Inventor: Ju Hyun Lee, Choongchungnam-do (KR)

(73) Assignee: Testech, Inc., Choongnam (KR)

( * ) Notice: Subject to any disclaimer, the term of this patent is extended or adjusted under 35 U.S.C. 154(b) by 1552 days.

(21) Appl. No.: 09/738,986

(22) Filed: Dec. 19, 2000

(65) Prior Publication Data

US 2002/0027605 A1    Mar. 7, 2002

(30) Foreign Application Priority Data

Jan. 10, 2000    (KR) .................................. 2000-975

(51) Int. Cl.
H04N 3/14       (2006.01)
H04N 5/33       (2006.01)

(52) U.S. Cl. .................... 348/308; 382/124; 250/72

(58) Field of Classification Search ............... 348/308; 382/129; 250/72; 713/186

See application file for complete search history.

(56) References Cited

U.S. PATENT DOCUMENTS 4,336,998 A    6/1982    Ruell
6,011,859 A *  1/2000    Kalnitsky et al. ........... 382/124
6,091,838 A *  7/2000    Burrows et al. ............. 382/124
6,219,793 B1 * 4/2001    Li et al. ....................... 726/19
6,326,644 B1 * 12/2001   Lee et al. ..................... 257/91
6,628,377 B1 * 9/2003    Sabatini et al. ............... 356/71

* cited by examiner

Primary Examiner—Tuan Ho
Assistant Examiner—Gevell Selby
(74) Attorney, Agent, or Firm—Ked & Associates, LLP

(57) ABSTRACT

A method for manufacturing a fingerprint recognition sensor is provided. The method includes providing a CMOS sensor; depositing a transparent electrode layer as a thin film on the upper portion of the CMOS image sensor, to which a terminal of an AC power source is connected, the transparent electrode layer being made of a transparent insulating material and a transparent conductive material; forming a luminescent layer at the upper portion of the transparent electrode layer to generate a light image; forming a dielectric layer at the upper portion of the luminescent layer; and forming a contamination-resistance film at the upper portion of the dielectric layer. With this method, since the CMOS image sensor is utilized, circuit construction can be simplified. In addition, a fingerprint image having a good contrast can be obtained.

3 Claims, 5 Drawing Sheets

FINGERPRINT RECOGNITION SENSOR AND MANUFACTURING METHOD THEREOF

BACKGROUND OF THE INVENTION

1. Field of the Invention

The present invention relates to a fingerprint recognition sensor and its manufacturing method, and more particularly to a one chip-based finger recognition sensor using a CMOS (Complementary Metal-oxide Semiconductor) sensor and its manufacturing method.

2. Description of the Background Art

Generally, in order for portable information communication instruments such as a mobile phone or a portable computer (that is, a laptop computer) to have a security function by using fingerprints, a very thin fingerprint recognition sensor is required.

FIG. 1 is a schematic view of a fingerprint recognition system in accordance with a conventional art.

As shown in the drawing, a conventional fingerprint recognition system includes an image generator 10 and a sensor-arranged part 20.

The image generator 10 includes a single electrode electro-luminescence device 12 and an A/C power source 14, and the single electrode electro-luminescence device 12 includes a transparent electrode 13, a luminescent layer and a dielectric layer 17.

However, the conventional fingerprint recognition system constructed as described above has a problem that, since the image generator 10 and the sensor-arranged part 20 are separated at a distance to each other, the light coming out of the image generator 10 spreads out to reach the surface of the sensor-arranged part 20 like the arrows as shown in FIG. 1L, rather than traveling straight, resulting in that an optical image of fingerprints is unclear.

In this respect, the longer the image generator 10 is away from the sensor-arranged part 20, the more the light radiating from the image generator 10 is lost, so that the optical image of the fingerprints grows more dim.

In detail, in the conventional fingerprint recognition system, the light coming out of the luminescent layer 15 is radiated in three-dimensional manner. At this time, since the light is reflected on the dielectric layer 17, the light is thus directed to the sensor-arranged part 20. In this respect, the light spreads in a two-dimensional manner, rather than going straight ahead, to reach the surface of the sensor-arranged part 20. And, at this time, the light works on the light reflected on the dielectric layer 17, creating a noise, so that a high contrast image is hardly obtained.

Also, in this case, since the light generated due to the ridge of a fingerprint spreads toward the valley of the fingerprints, it is very difficult to obtain a high-quality fingerprint from a sweat hand of a person.

In addition, the surface of the single electrode electro-luminescence unit 12 is made of a dielectric layer 17. Thus, in case that it is employed as a fingerprint recognition element to be used by numerous persons (i.e., in case of a fingerprint image which has been taken by more than 100 times, which is repeated for a week), as shown in FIG. 2, the surface of the fingerprint recognition element is contaminated by dirt of fingerprints, degrading the finger image.

SUMMARY OF THE INVENTION

Therefore, an object of the present invention is to provide a single-chip fingerprint recognition sensor using a CMOS sensor which is capable of overcoming the problems of the conventional art, and its manufacturing method.

Another object of the present invention is to provide a fingerprint recognition system using a CMOS sensor having a ground frame structure which facilitates acquiring fingerprints as well as providing a desirable fingerprint image.

To achieve these and other advantages and in accordance with the purpose of the present invention, as embodied and broadly described herein, there is provided a fingerprint recognition sensor including: a CMOS image sensor; a transparent electrode layer disposed at an upper portion of the CMOS image sensor; a luminescent layer disposed at the upper portion of the transparent electrode layer and having fluorescent particles and a binder; a dielectric layer disposed at the upper portion of the luminescent layer; and contamination-resistance film disposed at the upper portion of dielectric layer.

In order to achieve the above objects, there is also provided a method for manufacturing a fingerprint recognition sensor, including the steps of: providing a CMOS image sensor; depositing a transparent electrode layer as a thin film on the upper portion of the CMOS image sensor, to which a terminal of an AC power source is connected, the transparent electrode layer being made of a transparent insulating material and a transparent conductive material; forming a Luminescent layer at the upper portion of the transparent electrode layer to generate a light image; forming a dielectric layer at the upper portion of the luminescent layer; and forming a contamination-resistance film at the upper portion of the dielectric layer.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 6A through 6C illustrate a fingerprint recognition system in accordance with another embodiment of the present invention, of which FIG. 6A is a sectional view of a fingerprint recognition system using a CMOS sensor;

FIG. 6B is a plan view of the fingerprint recognition system using the CMOS sensor of FIG. 6A; and FIG. 6C is a schematic perspective view of a ground frame, a major part.

DETAILED DESCRIPTION OF THE PREFERRED EMBODIMENTS

Reference will now be made in detail to the preferred embodiments of the present invention, examples of which are illustrated in the accompanying drawings.

Figure 1:
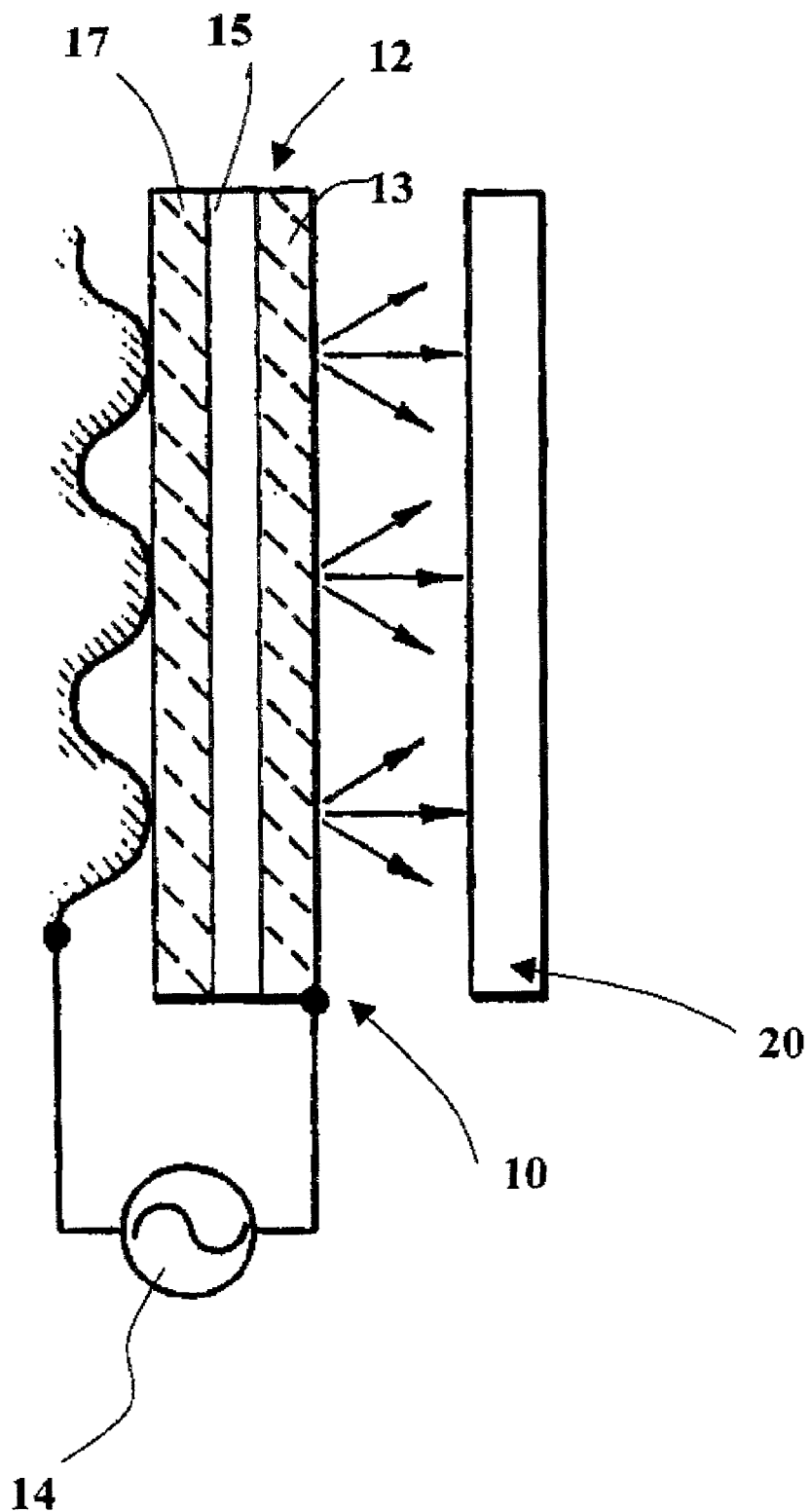
FIG. 1 is a schematic view showing a fingerprint recognition system in accordance with a conventional art.
Figure 2:
FIG. 2 is a view showing a fingerprint image obtained by adopting the fingerprint recognition system of FIG. 1 in accordance with the conventional art.
Figure 3:
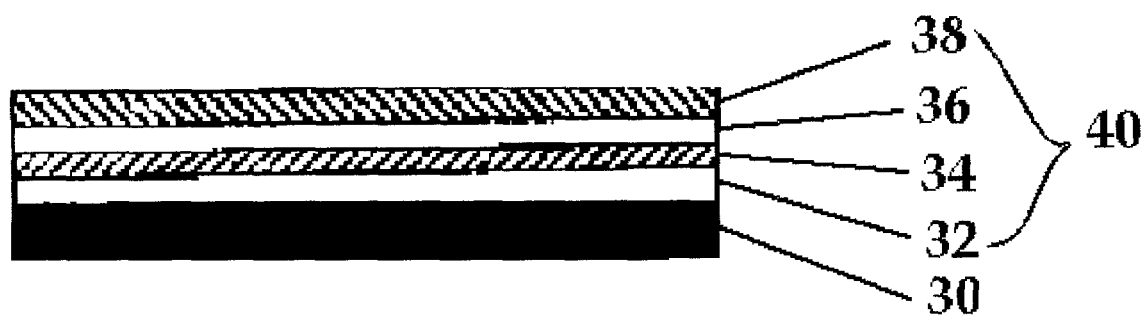
FIG. 3 is a sectional view of a fingerprint recognition sensor in accordance with one embodiment of the present invention.
Figure 4:
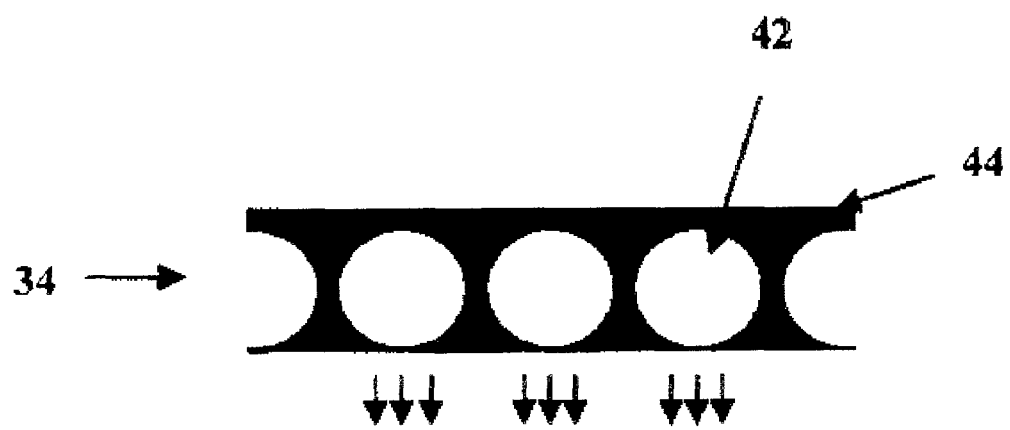
FIG. 4 is a sectional view of a luminescent layer, a major part in accordance with the present invention.

FIG. 3 is a sectional view of a fingerprint recognition sensor in accordance with one embodiment of the present invention, and FIG. 4 is a sectional view of a luminescent layer, a major part in accordance with the present invention.

As shown in FIGS. 3 and 4, the fingerprint recognition sensor includes, at large, a CMOS image sensor 30 and a contact luminous element 40. The contact luminous element 40 includes a transparent electrode layer 32 formed at the upper portion of the CMOS image sensor 30, a luminescent layer 34 formed at the upper portion of the transparent electrode layer 32 and having fluorescent particles 42 and a binder 44, a dielectric layer 36 formed at the upper portion of the luminescent layer 34, and a contamination-resistance layer 38 formed at the upper portion of the dielectric layer 36.

Though not shown, one terminal of AC power source is connected to one end of the transparent electrode layer 32.

The fingerprint recognition sensor of the present invention is featured in that the transparent electrode layer 32 of the contact luminous element 40 is directly deposited as a thin film on the surface of the CMOS image sensor 30.

In the case that the CMOS image sensor 30 is utilized in this manner, since an analog signal is converted to a digital data to be outputted, any additional circuit related to a digital conversion of an image signal is not required, so that its circuit construction can be simplified.

Meanwhile, a method for manufacturing a fingerprint recognition sensor, includes the steps of: providing a CMOS image sensor 30; depositing a transparent electrode layer 32 as a thin film on the upper portion of the CMOS image sensor, to which a terminal of an AC power source is connected, the transparent electrode layer being made of a transparent insulating material and a transparent conductive material; forming a luminescent layer 34 at the upper portion of the transparent electrode layer 32 to generate a light image; forming a dielectric layer 36 at the upper portion of the luminescent layer 34; and forming a contamination-resistance film 38 at the upper portion of the dielectric layer 36.

As shown in FIG. 4, as to the luminescent layer 34, a black-colored light absorbent layer (not shown) is coated on the surface of the luminescent layer 34 and diffused downwardly to thereby cover the surface of the fluorescent particles 42 of the luminescent layer 34. In this respect, since the black-colored light absorbent layer is diffused from the surface in the downward direction, more light absorbents are distributed at the upper surface of the fluorescent particles 42, and as it goes downwardly, the light absorbent is relatively reduced.

Figure 5:
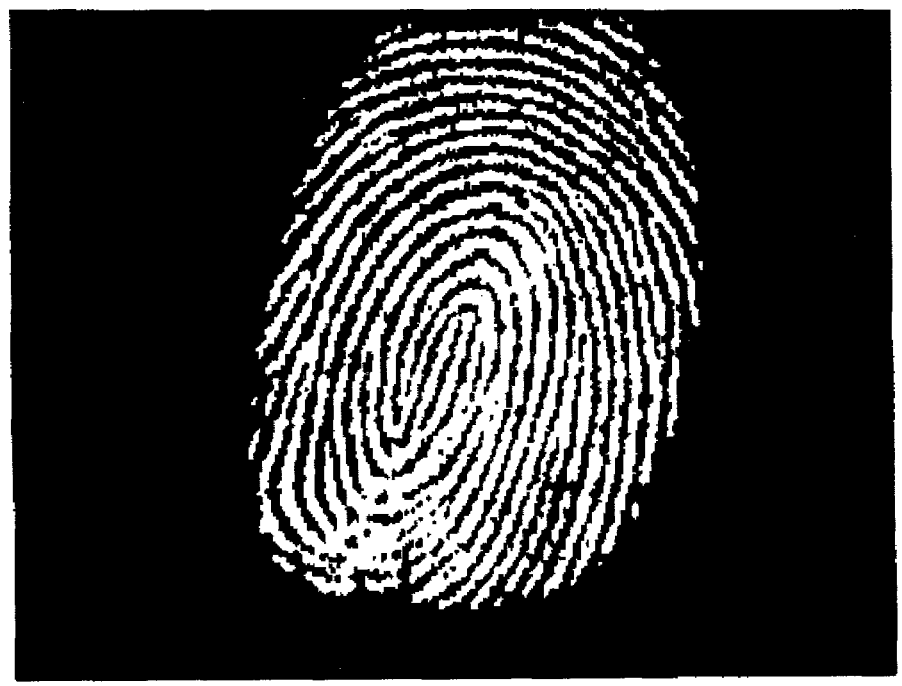
FIG. 5 is a view showing a fingerprint image obtained by adopting the fingerprint recognition system in accordance with one embodiment of the present invention.

Accordingly, the light directing upwardly and to the side of the fluorescent particles 42 is absorbed by the light absorbent, and only the light directing downwardly goes straight to the surface of the CMOS image sensor 30, so that a fingerprint image having a very good contrast as shown in FIG. 5 is obtained.

Especially, in this case, since only the spot where an electric field is intensively formed is luminescent, a noise image due to sweat can be minimized.

The contamination-resistance film 38 of the present invention is formed by using $TiO_2$ powder, that is, a photocatalytic material, and a polymer binder. As the $TiO_2$ power has a quite low affinity with moisture, a main constituent of sweat, or oiliness, its contamination-resistance is very strong to sweat or dirt. Thus, as shown in FIG. 5, the fingerprint image is not degraded.

In other words, when ultraviolet rays are radiated on the contamination-resistance film, $TiO_2$ works as a photo-catalyst, having a characteristic of dissolving dirt itself.

Figure 6A:
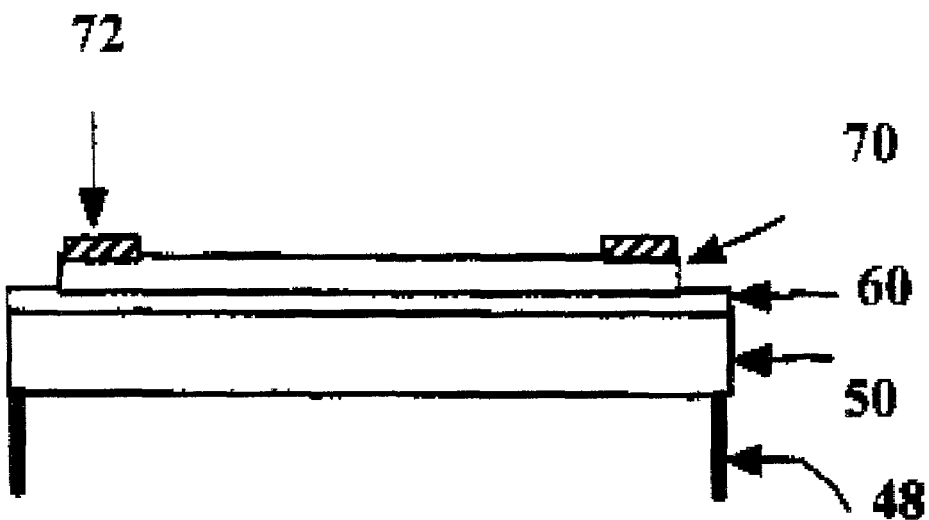
Figure 6B:
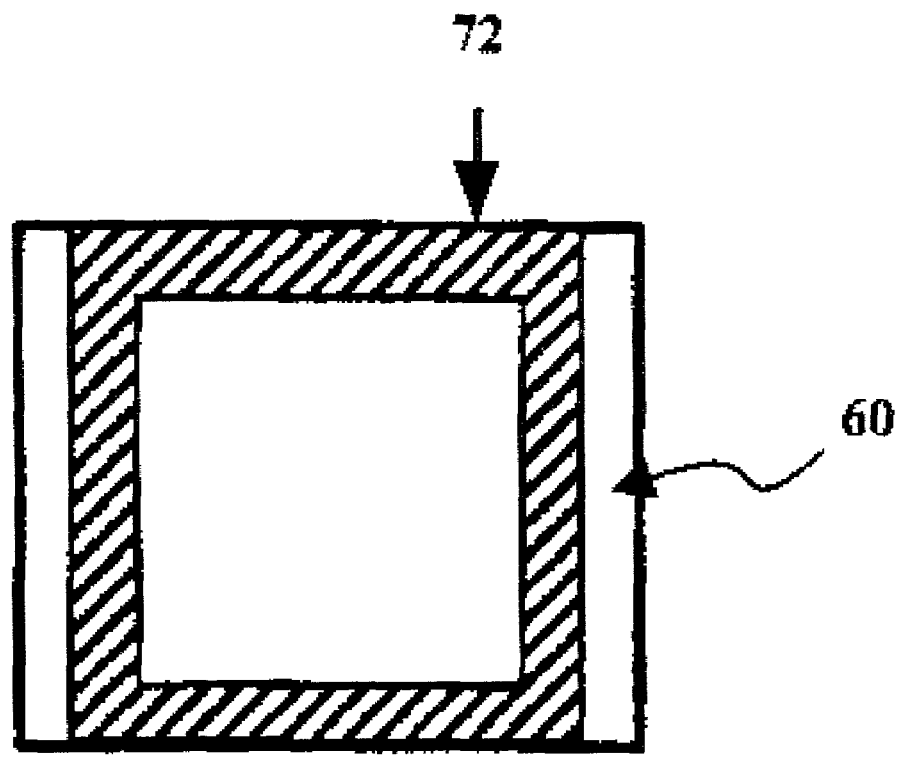
Figure 6C:
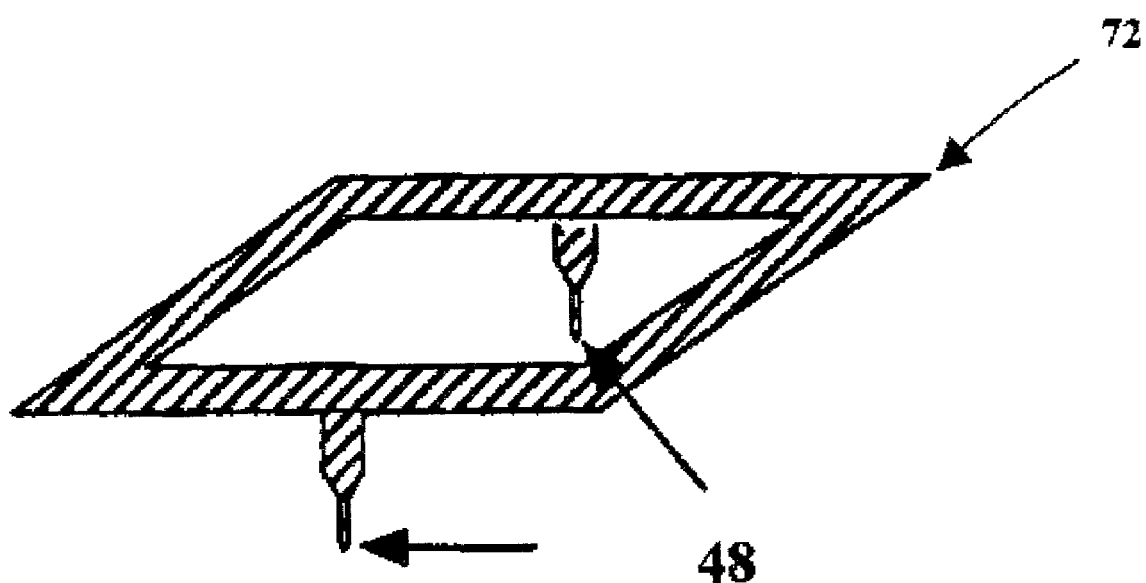

FIGS. 6A through 6C illustrate a fingerprint recognition system in accordance with another embodiment of the present invention, of which FIG. 6A is a sectional view of a fingerprint recognition system using a CMOS sensor; FIG. 6B is a plan view of the fingerprint recognition system using the CMOS sensor of FIG. 6A; and FIG. 6C is a schematic perspective view of a ground frame, a major part.

As shown in the drawing, the fingerprint recognition system in accordance with another embodiment of the present invention includes a CMOS image sensor 50, a transparent electrode thin film 60 directly deposited as a thin film on the surface of the CMOS image sensor 50, and a fingerprint recognition sensor 70 installed at the upper portion of the transparent electrode thin film 60.

On the fingerprint recognition sensor 70, as shown in FIG. 6C, a ground frame 72 is formed, to which one terminal of an AC power source (not shown) is applied and the other terminal of the AC power source is applied to the transparent electrode thin film 60. And, at least one pin 48 is disposed at a predetermined portion of the ground frame 72.

The operation of the fingerprint recognition sensor constructed as described above in accordance with another embodiment of the present invention will now be explained.

After an AC power source is applied to the transparent electrode thin film 60 and to the ground frame 72, when fingerprints simultaneously contact the surface of the fingerprint recognition sensor 70 and the ground frame 72, an optical image of the fingerprint is generated by the fingerprint recognition sensor 70. The optical image is converted to a digital signal by the CMOS image sensor 50 and transmitted to a matching system (not shown).

As so far described, the fingerprint recognition sensor and manufacturing method thereof has the following advantages.

That is, first, since the CMOS image sensor is utilized, any additional circuit is not required for digital conversion of the image signal, so that the circuit construction can be simplified.

Secondly, since the transparent electrode is directly deposited as a thin film on the surface of the CMOS image sensor, on which the fingerprint recognition sensor is installed, a fingerprint image having a good contrast can be obtained.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A fingerprint recognition sensor, comprising:
   a CMOS image sensor;
   a transparent electrode layer formed at an upper portion of the CMOS image sensor, one terminal of an AC power source being connected with said transparent electrode layer;

a luminescent layer formed on the transparent electrode layer, said luminescent layer having fluorescent particles and a binder;

a dielectric layer formed at an upper portion of the luminescent layer; and a contamination-resistance film formed at an upper portion of the dielectric layer, wherein a light absorbent layer is coated on the surface of the luminescent layer and diffused to thereby cover the surface of the fluorescent particles existing in the luminescent layer such that more light absorbent material is distributed at an upper surface of the fluorescent particles.

2. The fingerprint recognition sensor according to claim 1, wherein the transparent electrode layer is directly deposited as a thin film on the CMOS image sensor.

3. A method for manufacturing a fingerprint recognition sensor, comprising:

providing a CMOS image sensor;

directly depositing a transparent electrode layer as a thin film at an upper portion of the CMOS image sensor and connecting one terminal of an AC power source to the transparent electrode layer, said transparent electrode layer being made of a transparent insulating material and a transparent conductive material;

forming a luminescent layer at an upper portion of the transparent electrode layer to generate an optical image;

forming a dielectric layer at an upper portion of the luminescent layer; and forming a contamination-resistance film at an upper portion of the dielectric layer, wherein a light absorbent layer is coated on the surface of the luminescent layer and diffused to thereby cover the surface of the fluorescent particles existing in the luminescent layer.

* * * * *